United States Patent Office 2,726,792
Patented Dec. 13, 1955

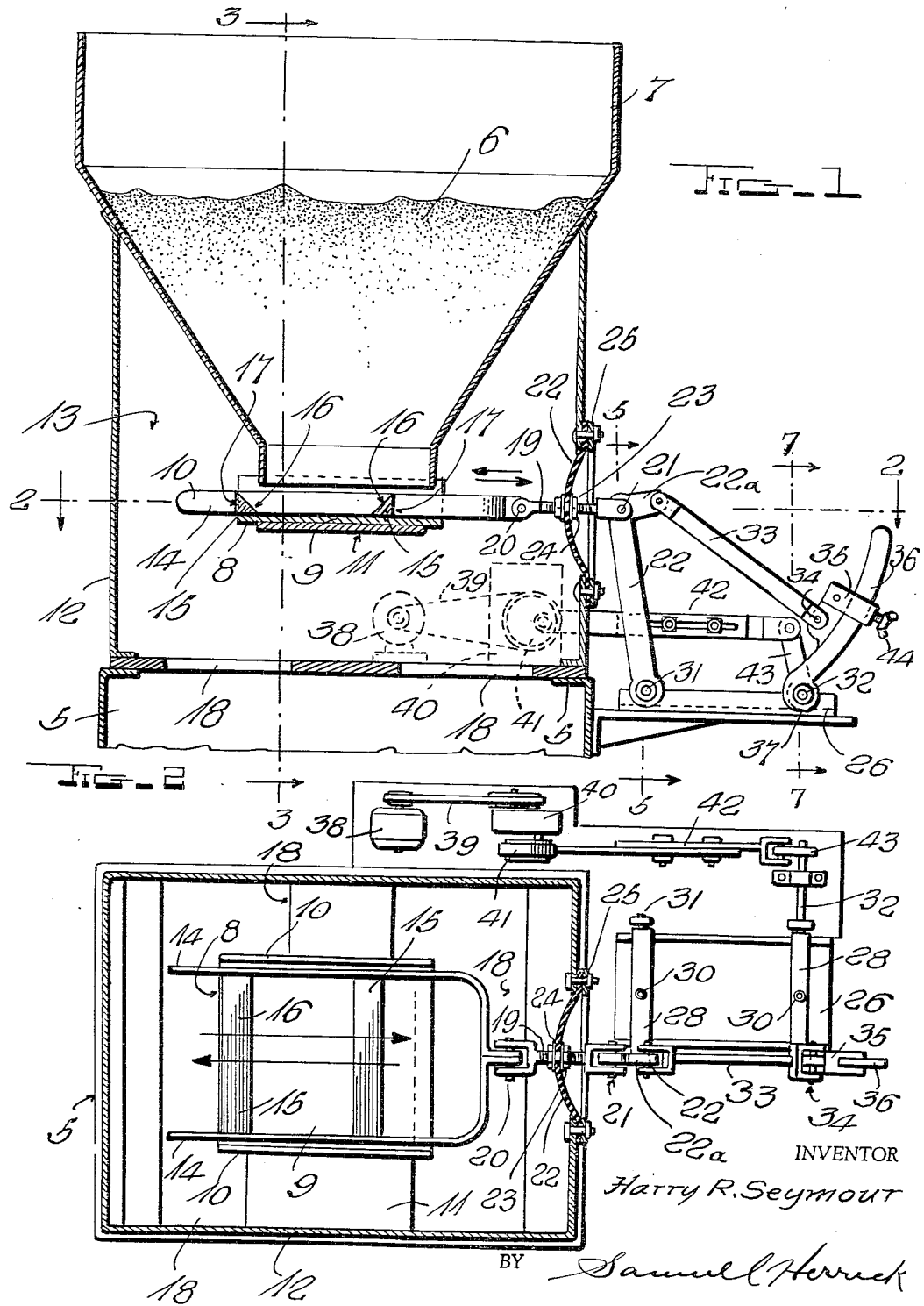

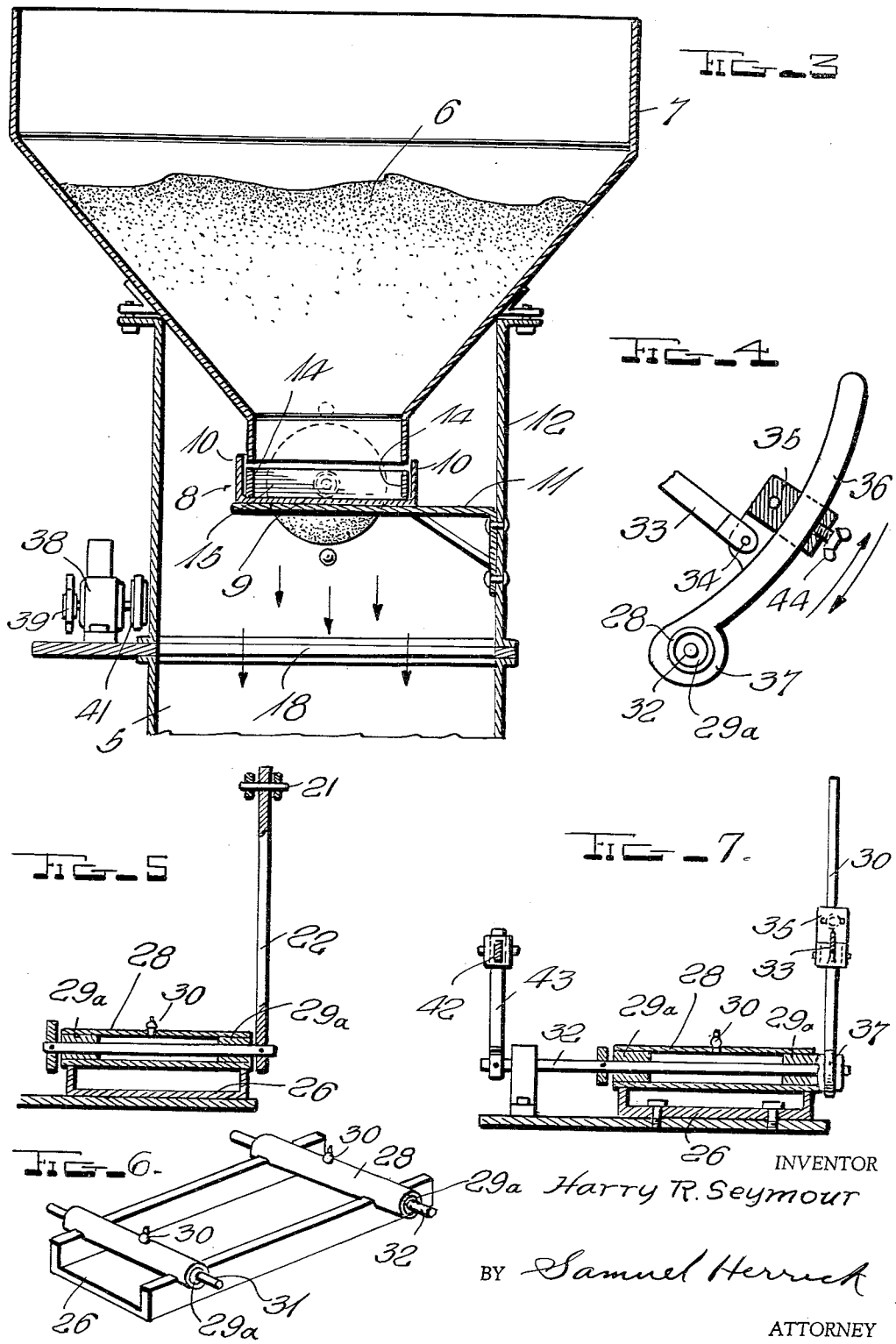

2,726,792

MECHANISM FOR FEEDING MEASURED QUANTITIES OF DRY CHEMICAL

Harry R. Seymour, Bartow, Fla.

Application August 24, 1953, Serial No. 375,956

8 Claims. (Cl. 222—199)

This invention relates to a mechanism for feeding measured quantities of dry material powdered or granulated from a supply source and for varying the rate of feed at will.

While the device is of utility in connection with the measured and proportionate feeding of a wide range of materials, it is of especial utility in feeding dry chemicals such as alum, lime, soda ash and the like and for purposes of explanation the invention will be described in connection with water softening apparatus. However, the invention is not limited to any such particular use.

The invention will be best understood by reference to the accompanying drawings wherein:

Fig. 1 is a central vertical sectional view through a device constructed in accordance with the invention;

Fig. 2 is a horizontal sectional view upon line 2—2 of Fig. 1 with the hopper removed;

Fig. 3 is a vertical sectional view upon line 3—3 of Fig. 1;

Fig. 4 is a detail view of a quadrant and its associated parts, hereinafter described;

Fig. 5 is a vertical sectional view upon line 5—5 of Fig. 1;

Fig. 6 is a perspective view of a bearing supporting pan hereinafter described, and Fig. 7 is a transverse sectional view upon line 7—7 of Fig. 1.

In the drawings 5 designates a tank which may contain water to be softened or any other material into which measured quantities of a dry powdered or granulated chemical 6 are to be fed from a hopper 7. This hopper may be square, round, rectangular or otherwise and it represents any member for presenting dry material to be fed at an orifice, which, in the illustrated construction, is constituted by the open bottom of the hopper. A fixed pan 8 comprising a plate like bottom 9 and upstanding side walls 10 is supported by a bracket 11 from one of the side walls of a casing 12. The top of this casing is secured to the side walls of the hopper and said casing encloses a space 13 within which a feed element is located and operates. This element consists of a ladder like rake comprising side rails 14 and a pair of cross bars 15. This element slides upon the bottom 9 of the fixed pan and is guided by the side walls 10. The cross bars 15 have inclined or bevel faces 16 and vertical outer walls 17 and these faces and walls constitute a very important part of the invention in that when the rake is reciprocated endwise by mechanism hereinafter described, the inclined faces serve as lifting and agitating members while the vertical walls act as pushers to push the material which lies outwardly of them, over the ends of bottom 9, such material falling into the tank 5 through a suitable opening or openings 18. Thus it will be seen that a feeding of the material takes place at the end of each stroke of the rake and in each direction of stroke.

It is well known to those skilled in the operation of devices for feeding dry chemicals, that during the off peak hours of operation some chemicals, especially lime, become gummy and sticky making it difficult to maintain accurate proportions in the feeding of the same. It will be noted that in the movement of the rake to the left in Fig. 1 the vertical face of the left hand bar is pushing material to the left and off of the left end of plate or bottom 9 while at the same time the inclined face of the right hand bar is lifting and agitating the material 6, causing some of the material to fall behind its vertical face of said bar ready to be pushed off of the right hand of plate 9 when the direction of movement of the rake is reversed.

The movement of the rake and the extent of its throw (and consequently the rate of feed of material 6), are effected and controlled by a mechanism comprising a drag link 19, one end of which is attached to the rake at 20 and the other end of which is pivotally connected at 21 to an upstanding arm 22. An intermediate portion of the drag link passes through a flexible diaphragm 22' of neoprene or any other elastic, waterproof and strong material. Nuts 23 and rubber washers 24 seal the engagement of the drag link with the diaphragm. The periphery of the diaphragm is secured by ring 25 to the wall of casing 12 so that the drag link may reciprocate the rake while at the same time dust from the material being fed, is prevented from escaping from space 13.

A bearing supporting pan 26 has upstanding side walls 27 by which fixed bearing supporting sleeves 28 and 29 are supported. The outer ends of these sleeves are closed by bushings 29a, preferably of bronze, and the intermediate portions of the sleeves carry grease gun fittings 30, to the end that transverse shafts 31 and 32, which are supported for oscillation by the bushings, may be kept lubricated indefinitely without attention.

The lower end of arm 22 is secured upon shaft 31 and swings back and forth, with said shaft as its pivotal support. An extension 22a of arm 22 has pivotal connection with a link 33. Link 33 is pivotally connected at 34 to a block 35 that is slidably mounted upon an arcuate quadrant arm 36. The lower end of the quadrant arm is affixed by means of its integral collar 37 upon shaft 32. Any suitable driving means may be employed for imparting oscillation to shaft 32 for the purpose of swinging the quadrant arm back and forth. A means has been illustrated for accomplishing this purpose and consists of a motor 38 which drives by a belt 39 to and through a reducing gear 40 to an eccentric 41. This eccentric has its adjustable strap 42 pivotally connected to a crank arm 43 on shaft 32. Suitable and conventional collars upon shafts 31 and 32 hold them against endwise movement.

From the foregoing it will be clear that by loosening a set screw 44 quadrant block 35 may be shifted upon the arcuate quadrant arm to increase or decrease the length of stroke of the rake and thereby increase or decrease the amount of material fed per stroke.

The arrangement described provides a rugged, long lived and reliable construction, all parts of which are disposed outside of a chamber in which the rake moves, where they will not be exposed to a cloud of chemical dust. While the driving means for the rake is highly efficient it will be apparent that the novel bevel and straight faces of the rake will function as described irrespective of the particular means employed to impart reciprocation to the rake.

Therefore it is to be understood that the invention is not limited to the particular construction shown but that it includes within its purview whatever changes fairly come within the terms or the spirit of the appended claims.

What is claimed is:

1. In a device of the character described a hopper for containing material to be fed therefrom said hopper having an open bottom, a substantially horizontal plate-like member extending beneath the hopper in spaced relation thereto, a combined material agitating and feeding element disposed for endwise sliding movement upon the plate-like member and comprising a pair of cross bars each having a vertical face and an inclined face with the vertical faces disposed toward the opposite ends of the plate like member and with the inclined faces confronting each other and means for imparting back and forth sliding movement in a substantially horizontal plane, to said agitating and feeding element over and upon the fixed plate like member.

2. A structure as recited in claim 1 in combination with means for adjusting the extent of the movement of the agitating and feeding element in its horizontal travel.

3. A structure as recited in claim 1 wherein the length of the plate like member is such with respect to the length of travel of the agitating and feeding element that the material lying in advance of the vertical faces of the cross bars is pushed by said cross bars off of the opposite ends of the plate like member at the end of the movement of said feeding element in both directions.

4. In an apparatus of the character described the combination with a tank, a hopper disposed above the tank for the reception of material to be fed into the tank, a fixed plate disposed horizontally between tank and hopper, a ladder like feeder mounted to slide upon said plate comprising side rails and a pair of cross bars, a motor and connections between the motor and the feeder for imparting bodily endwise, reciprocation to the feeder from the motor, said cross bars of the feeder having vertical outer faces and beveled or inclined inner faces, said inclined face of each bar exerting a lifting action upon the material to be fed upon the inward movement of the bars and the vertical face of the same bar acting to push the material in front thereof to a point of discharge one of said bars pushing the material in one direction of travel of the feeder and the other of said bars pushing the material in the other direction of travel of the feeder.

5. A structure as recited in claim 4 in combination with means for adjusting the length of stroke of the feeder.

6. In a structure of the character described the combination with a hopper for powdered or granulated water softening chemical having an open bottom, a water tank below the hopper, a feed mechanism between the hopper and tank comprising a reciprocatory member, a casing enclosing the space between the hopper and tank, said casing having an opening of considerable size in its side wall in line with the reciprocatory member, a flexible diaphragm covering said opening and a power operated linkage mechanism connected to the diaphragm and to the said reciprocatory member and serving to actuate the reciprocatory member from a point outside of the casing while the diaphragm prevents the escape of chemical dust from said casing.

7. A structure as recited in claim 1 wherein the movement imparting means comprises a drag link connected to said rake, a quadrant arm mounted to swing back and forth in a vertical plane upon a horizontal transverse shaft, a block, means for adjusting said block along the quadrant arm and a connecting link connected to said block and means for connecting said link to the drag link.

8. A structure as recited in claim 1 wherein the movement imparting means comprises an upstanding arm to the upper portion of which the drag link and the connecting link are pivotally connected, the lower end of said upstanding arm being likewise pivotally supported upon a second horizontal transverse shaft, a bearing supporting pan carrying a pair of transverse bearing sleeves, bearing bushings in the outer ends of said sleeves in which the horizontal transverse shafts are mounted for oscillation, a crank upon one of the transverse shafts and means for imparting back and forth swinging movement to said crank to effect an oscillation of the shaft upon which it is mounted.

References Cited in the file of this patent

UNITED STATES PATENTS

| 88,812 | Runstetler | Apr. 13, 1896 |
| 1,796,935 | Matthews | Mar. 17, 1931 |
| 1,865,290 | Vaughn | June 28, 1932 |
| 2,432,852 | Arvidson | Dec. 16, 1947 |
| 2,529,654 | Gilmore et al. | Nov. 14, 1950 |
| 2,544,541 | McCarthy et al. | Mar. 6, 1951 |